(12) United States Patent
Xiao et al.

(10) Patent No.: US 10,698,608 B2
(45) Date of Patent: Jun. 30, 2020

(54) METHOD, APPARATUS AND COMPUTER STORAGE MEDIUM FOR DATA INPUT AND OUTPUT

(71) Applicant: EMC IP Holding Company LLC, Hopkinton, MA (US)

(72) Inventors: Pan Xiao, Chengdu (CN); Kiko Wang, Chengdu (CN); Yang Zhang, Chengdu (CN); Allen Chen, Chengdu (CN); Fang Du, Guangyuan (CN); Zhenzong Jiang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 16/225,483

(22) Filed: Dec. 19, 2018

(65) Prior Publication Data

US 2019/0324656 A1   Oct. 24, 2019

(30) Foreign Application Priority Data

Apr. 20, 2018   (CN) .......................... 2018 1 0365194

(51) Int. Cl.
*G06F 12/00* (2006.01)
*G06F 3/06* (2006.01)

(52) U.S. Cl.
CPC ............ *G06F 3/0608* (2013.01); *G06F 3/067* (2013.01); *G06F 3/0629* (2013.01); *G06F 3/0662* (2013.01)

(58) Field of Classification Search
None
See application file for complete search history.

(56) References Cited

U.S. PATENT DOCUMENTS

| | | | |
|---|---|---|---|
| 8,204,905 B2* | 6/2012 | Kuo ...................... | G06Q 30/02 707/780 |
| 2012/0290765 A1* | 11/2012 | Durrant ................. | G06F 12/023 711/6 |
| 2013/0185480 A1* | 7/2013 | Newell ................. | G06F 12/023 711/103 |
| 2014/0229452 A1* | 8/2014 | Serita .................. | G06F 16/1748 707/692 |
| 2017/0097773 A1* | 4/2017 | Camp ................. | G06F 12/1009 |

* cited by examiner

*Primary Examiner* — John A Lane
(74) *Attorney, Agent, or Firm* — BainwoodHuang

(57) ABSTRACT

Techniques perform data input and output. For example, there is provided a technique for updating a data pattern table. The technique involves: during a time period for establishing or updating the data pattern table: receiving a data write request; making statistics of a frequency of data being written; and writing data frequently used and an identification of the data to a corresponding entry of the data pattern table based on a result of the statistics. Using such a technique, a data pattern table can be customized and data storage efficiency can be improved.

7 Claims, 7 Drawing Sheets

| INDEX | DATA STREAM | COUNT |
|---|---|---|
| $H_i$ | 0x1234... | 90 |
| $H_j$ | 0x5678... | 1 |
| $H_k$ | 0xdfdf... | 1 |
| ... | ... | ... |
| $H_n$ | 0x1133 | 10 |

$P_t$ RUNNING STATE

| INDEX | DATA STREAM | COUNT |
|---|---|---|
| $H_m$ | 0x1234... | 1500 |
| $H_j$ | 0x5678... | 1200 |
| $H_p$ | 0xdfdf... | 900 |
| ... | ... | ... |
| $H_n$ | 0x1133 | 1 |

$P_t$ FINAL STATE

METHOD, APPARATUS AND COMPUTER STORAGE MEDIUM FOR DATA INPUT AND OUTPUT

FIELD

Embodiments of the present disclosure generally relate to the field of storage systems, and more specifically, to a method, an apparatus and a computer storage medium for controlling data input and output in a storage system.

BACKGROUND

With the emergence of a variety of applications, it is required to store a large amount of data in a storage system. Besides, the applications when running needs to frequently access the storage system, that is, writing data into the storage system or reading data from the storage system. For a storage system supporting a plurality of applications, it means the occupation of a large storage space and heaving processing burdens.

SUMMARY

Embodiments of the present disclosure provide a method, an apparatus and a computer storage medium for controlling data input and output.

In a first aspect of the present disclosure, there is provided a method of updating a data pattern table. The method includes: during a time period for establishing or updating the data pattern table: receiving a data write request; making statistics of a frequency of data being written; and based on a result of the statistics, writing data frequently used and an identification of the data to a corresponding entry of the data pattern table.

In some embodiments, making statistics of a frequency of data being written includes: acquiring an identification of a data chunk associated with the data write request; recording a count of the data chunk being used; and wherein writing data frequently used and an identification of the data to a corresponding entry of the data pattern table includes: writing one or more data chunks of the data chunks recorded with a maximum count and an identification of the one or more data chunks to a corresponding entry of the data pattern table. In a further embodiment, the number of the one or more data chunk with the maximum count is configurable.

In some embodiments, recording a count of the data chunk being used includes: comparing the identification with an entry in a data statistical table, each entry in the data statistical table indicating a data chunk, an identification of the data chunk and a count of the data chunk being used; in response to the identification hitting an entry in the data statistical table, increasing a count corresponding to the entry by one; and in response to the identification failing to hit an entry in the data statistical table, adding the data chunk, an identification of the data chunk and a count value indicative of the data chunk being used for the first time to the data statistical table as one entry.

In some embodiments, the data statistical table has a size limit, and the method includes: during a time period for updating a data pattern table, in response to the identification failing to hit an entry in the data statistical table and the data statistical table being smaller than the size limit, adding the data chunk, identification of the data chunk and a count value indicative of the data chunk being used for the first time to the data statistical table as one entry; and in response to the identification failing to hit an entry in the data statistical table and the data statistical table reaching the size limit, reducing entries of the data statistical table; and adding the data chunk, the identification of the data chunk and the count value indicative of the data chunk being used for the first time to the reduced data statistical table as one entry. In a further embodiment, reducing entries of the data statistical table includes: deleting one or more entries with a minimum count value from the data statistical table. In some embodiments, the number of the one or more entries deleted is configurable. In some other embodiments, reducing entries of the data statistical table includes: reducing the entries of the data statistical table by half.

In some embodiments, an initial state of the data statistical table is empty.

In some other embodiments, the data pattern table, before being updated, initially includes at least one of an all-zero and an all-one data patterns.

In some embodiments, the method further includes displaying to a user the number of times a data pattern in the data pattern table being hit and/or a storage space being saved for the storage system.

In a second aspect of the present disclosure, there is provided a method of controlling storing of data. The method includes: receiving a data write request; acquiring an identification of a data chunk associated with the data write request; comparing the identification with an entry in a data pattern table, each entry in the data pattern table including data frequently used by a storage system and an identification of the data and at least one entry including a data pattern other than all-zero and all-one data patterns; in response to the identification hitting an entry in the data pattern table, storing metadata of the data chunk only without writing the data chunk to a backend storage device of the storage system; and in response to the identification failing to hit an entry in the data pattern table, writing the data chunk to the backend storage device of the storage system.

In a third aspect of the present disclosure, there is provided a method of controlling reading of data. The method includes: receiving a data read request including an address and a data chunk size of data to be read; in response to the address and the data chunk size included in the data read request matching with an address and a data chunk size of data stored and frequently used, reading the data from a data pattern table, each entry of the data pattern table including data frequently used by a storage system and an identification of the data and at least one entry including a data pattern other than all-zero and all-one data patterns; and in response to the address and the data chunk size included in the data read request failing to match with an address and a data chunk size of data stored and frequently used, reading the data from a backend storage device.

In a fourth aspect of the present disclosure, there is provided an electronic device. The electronic device includes at least one processor; and at least one memory coupled to the at least one processor and including computer program code stored thereon, the computer program code, when executed by the at least one processor, causing the electronic device to perform the method according to any of the first aspect to the third aspect of the present disclosure.

In a fifth aspect of the present disclosure, there is provided a computer storage medium with computer program code stored thereon, the computer program codes, when executed in a processor, causing the processor to perform a method according to any of the first aspect to the third aspect of the present disclosure.

Although particular embodiments have been illustrated via examples in the drawings, it should be understood that descriptions of the detailed embodiments of the text are not intended for limiting the embodiments to the specific forms disclosed here.

BRIEF DESCRIPTION OF THE DRAWINGS

Through the disclosure and claims below, objectives, advantages and other features of the present disclosure will become more apparent. For the purpose of illustration, without suggesting any limitations, the preferred embodiments are provided with reference to the drawings, in which:

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that suchcombinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Many details are described in the following description for the purpose of explanation. However, those ordinary skilled in the art will recognize that the embodiments of the present disclosure can be implemented without utilizing the specific details. Therefore, the present disclosure is not limited by the illustrated embodiments. Instead, the present disclosure is given a broadest scope in consistency with the principles and features described herein.

It should be understood that the terms "first," "second" and the like are used for distinguishing one element from a further element only. However, the first element, in fact, can also be known as the second element and vice versa. Moreover, it should also be understood that "include" and "comprise" are only for explaining presence of stated features, elements, functions or components without excluding the presence of one or more other features, elements, functions or components.

Figure 1:
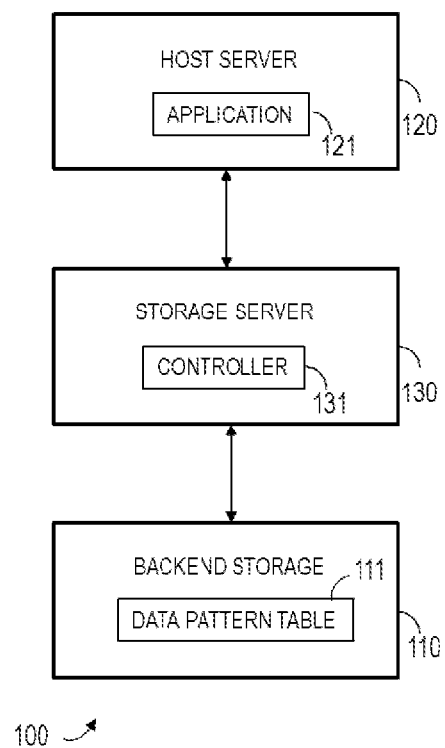
FIG. 1 illustrates a schematic structure diagram of an example computer system in which the embodiments of the present disclosure can be implemented.

FIG. 1 illustrates a schematic diagram of an example computer system 100 in which the embodiments of the present disclosure can be implemented. However, it should be noted that a particular architecture of the computer system as shown in FIG. 1 is not required in some embodiments.

The example computer system 100 shown in FIG. 1 includes a backend storage system 110, a host server 120 and a storage server 130. The host server can be loaded with an application 121. The application 121, while running, can access the storage server 130. The storage server 130 includes a controller 131 for processing an Input/Output (TO) request from the host server.

Currently, some storage products support an In Line Pattern Detection (ILPD) feature. By using this feature, the backend storage system 110 in FIG. 1 can enhance data access efficiency with a data pattern table 111, which records frequently used data patterns. For any incoming IOs, e.g. the IO requests from the host server 120, if the data content to be written with the request is identical to any of the data patterns in the data pattern table 111, such data will not be written into the backend storage 110. Instead, only the metadata of such data is recorded, such as the logic address (e.g., Logic Block Address (LBA)) and its pattern index in the data pattern table 111. Similarly, when the application 121 needs to retrieve data, the data, if already existed in the data pattern table 111, is directly returned to the application 121 from the data pattern table 111, thereby improving the data access efficiency.

However, a constraint of the current ILPD feature is that the employed data pattern table is predefined and there are only very limited data patterns in this table—usually only have patterns containing all zeros and all ones. This is because storage products are used in a wide range of different areas and it is hard to acquire the frequently used data patterns in a particular field. For example, when the customer's IO cannot be accessed, it is impossible to understand other frequently appeared data patterns in a real production environment other than all-zero and all-one data patterns. That is, although the ILPD function can assist customers to enhance the storage efficiency of data, the predefined data pattern table employed here cannot match for the application scenarios of the customers in a better way, thereby missing the opportunity to further improve the storage efficiency of data.

Regarding the limitation of the current ILPD features and other issues in the existing storage system, the inventor of the present disclosure proposes a solution for establishing a customized data pattern table. The content of the data pattern table can be customized according to different customer scenarios; therefore can better match special requirements of customers.

In some embodiments, this solution can include a background job running in customer's production environment, so as to observe and analyze the incoming IOs. However, the job only needs to run in a limited period of time. Once the job is finished, the data pattern table will be updated to contain frequently appeared data patterns.

A method 200 for establishing/updating a customized data pattern table according to the embodiments of the present disclosure is described below with reference to FIG. 2. The method can (but not limited to) be implemented in the storage server 130 of FIG. 1 as a background job, e.g., implemented by the controller 131. For the sake of description, embodiments of the method 200 will be described with reference to the controller 131.

However, it should be understood that the method 200 is not limited to be implemented in the particular example structure.

Figure 2:
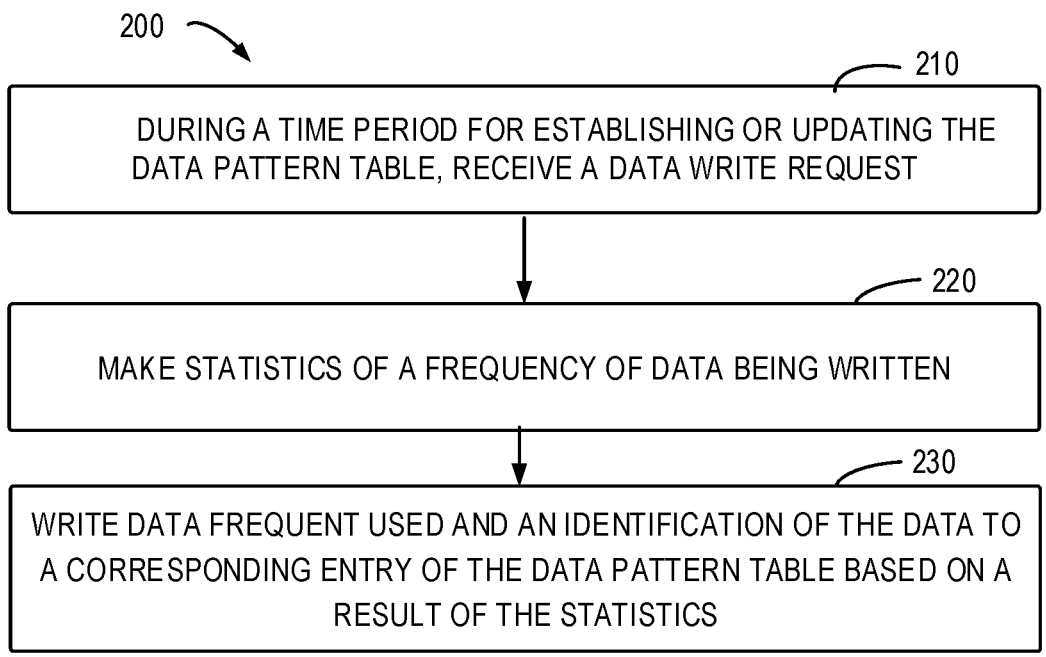
FIG. 2 illustrates a flow chart of a method of establishing/updating a data pattern table according to the embodiments of the present disclosure.

As shown in FIG. 2, the method includes receiving, at block 210, a data write request during a time period for establishing or updating the data pattern table (e.g., data pattern table 111 in FIG. 1), and making statistics of the frequency of data being written at block 220. Embodiments of the present disclosure are not limited to perform the statistical operations of the block 220 in any particular way. As an example instead of a limitation, the frequency of data being written can be counted by recording the number of times that the data is used. At block 230, based on a result of the statistics in the block 220, the controller 131 writes data frequently used and its identification into the data pattern table 111.

In some embodiments, the data pattern table 111, before being updated, can initially include at least one of an all-zero and an all-ones data patterns. Through the update operations of the method 200, the data pattern table 111 can include other frequently used data patterns that are obtained by statistics, to better match the particular requirements of the user.

In a further embodiment, the data pattern table 111 can initially be empty and the frequently used data patterns can be written through the method 200, such that the data pattern table 111 can include a data pattern specific to a particular user based on the statistical information, the data pattern including other data patterns other than all-zero and all-one data patterns.

As the creation/update of the data pattern table only needs to run within a limited time period for establishing or updating the data pattern table, e.g. running as a background job, no adverse impact will be exerted on the performance of the storage system. When the job is finished, read/write for the storage system can proceed as usual and data access efficiency is improved.

Besides, the data pattern table only records limited data patterns that frequently appear and ignores the rest data patterns. Because the other data patterns occur at a relatively low frequency, the ignorance of other data patterns will not impact a lot on space savings, but can significantly reduce usage of the central processing unit (CPU) and internal memory on looking up the data pattern table at the same time.

In some embodiments, since customers are more familiar with their production environment, they are allowed to choose when and how long to run the job, so as to give them the best opportunity to find the frequently used data patterns. In other words, the start and the length of the time period for establishing or updating the data pattern table can be configured by the user. Besides, there is no need for the users to provide the statistical data for other parties to analyze the data pattern. Instead, the users can self-define the creation of the data pattern table according to their own needs.

Figure 3:
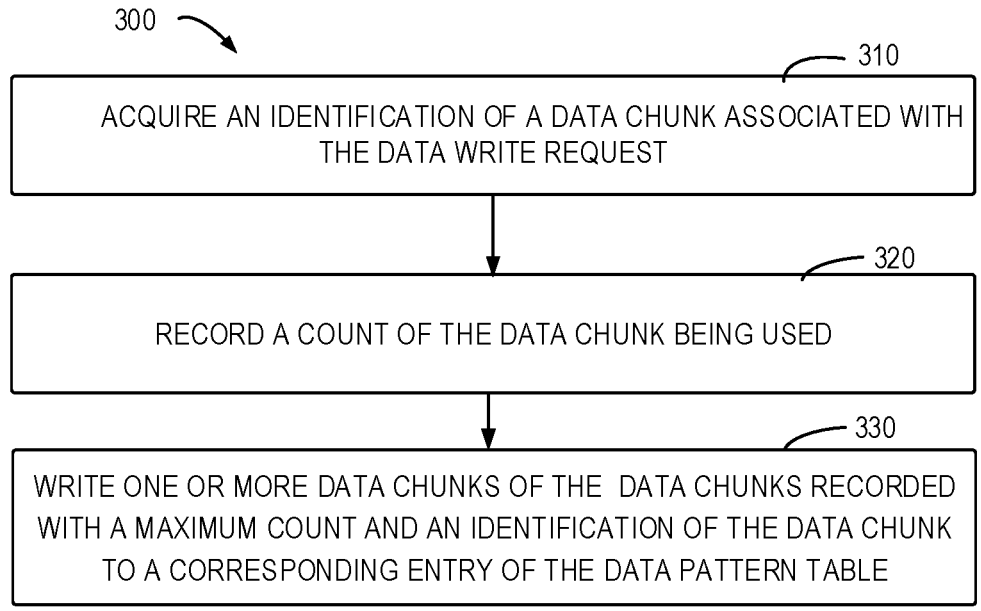
FIG. 3 illustrates a flow chart of another method of establishing/updating a data pattern table according to the embodiments of the present disclosure.

In some embodiments, the frequency of writing data can be counted in units of data chunk (for example, but not limited to, 8K bytes) as shown in FIG. 3. FIG. 3 illustrates an example method 300 for implementing operations of blocks 220 and 230 in FIG. 2. In this example, the controller 131 acquires, at block 310, an identification of a data chunk associated with a data write request. When the data write request involves a plurality of data chunks, the controller 131 can acquire identification of each data chunk. The controller 131 records, at block 320, the count of each data chunk being used, and writes, at block 330, one or more data chunks of the data chunks recorded with a maximum count and an identifications thereof into a corresponding entry of the data pattern table 111. In some embodiments, the number of the one or more data chunks with the maximum count that are written into the data pattern table 111 can be configured. For example, the controller 131 can determine the number based on the size of the available storage space.

Figure 4:
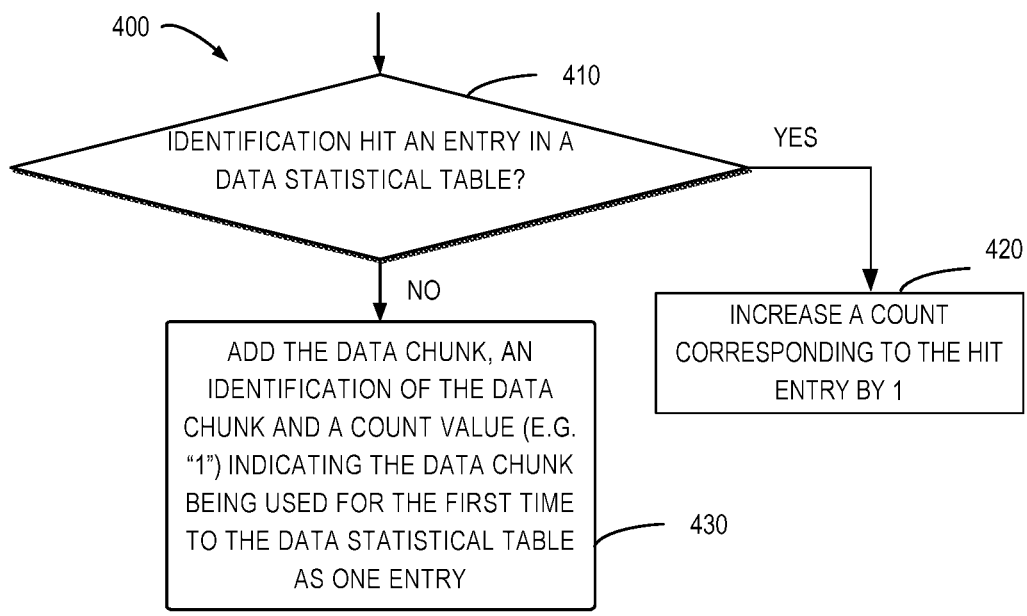
FIG. 4 illustrates a flow chart of a method of establishing/updating a data pattern table based on a data statistical table according to the embodiments of the present disclosure.

As an example instead of limitation, a count of each data chunk being used can be recorded using a data statistical table. FIG. 4 illustrates an example method 400 for implementing recording operations of block 320 in FIG. 3.

In this example, the controller 131 compares, at block 410, the identification of a database associated with a write request to an entry in the data statistical table. Each entry of the data statistical table indicates that a data chunk, an identification of the data chunk and a count of the data chunk are used. In some embodiments, the data statistical table is initially empty.

If the identification of the data chunk hits an entry in the data statistical table, it means that the data chunk has already been written and the controller 131 increases, at block 420, the count corresponding to the hit entry by a predetermined value (e.g., add 1).

In another aspect, if the identification fails to hit any entry in the data statistical table, it means that the data chunk has never been written in and the controller 131 adds, at block 430, the data chunk, an identification of the data chunk and a count value (e.g., "1") indicative of the data chunk being used for the first time into the data statistical table as one entry. Operations shown in FIG. 4 can be executed for each data chunk. Moreover, it should be understood that operations executed for each data chunk can be parallel or sequential.

Figure 5:
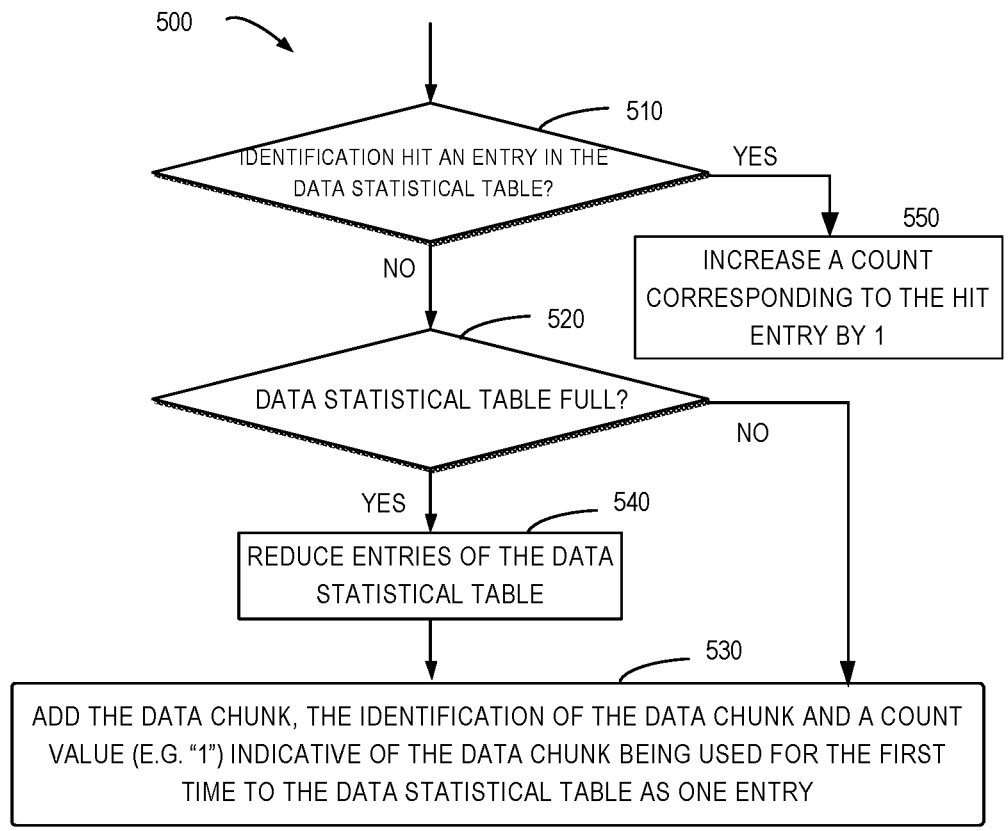
FIG. 5 illustrates a flow chart of a method of establishing/updating a data pattern table using a data statistical table with size limit according to the embodiments of the present disclosure.

In some embodiments, the data statistical table has limited size, that is, the number of the entries included therein is limited by a predetermined threshold. In this case, there might be a scenario that an entry needs to be added into the data statistical table but the data statistical table is already full. Therefore, in this embodiment, a purge may be required for the data statistical table during the time period for updating the data pattern table to allow addition of new entries. FIG. 5 illustrates an example of a part of the update procedure of a data pattern table, in which the purge of the data statistical table is involved.

As shown in FIG. 5, during the time period for updating the data pattern table, the controller 131, at block 510, determines whether the identification of a data chunk associated with a data write request hits an entry of the data statistical table. If yes, the controller 131 increases, at block 550, the count corresponding to the hit entry by a predetermined value (e.g., add 1). If not, the controller 131 determines, at block 520, whether the size of the data statistical table is smaller than its size limit, i.e., a predetermined threshold.

If the predetermined threshold is not reached, that is, the data statistical table is not full, the controller 131 adds, at block 530, the data chunk, the identification of the data chunk and a count value (e.g., "1") indicative of the data chunk being used for the first time directly into the data statistical table as one entry.

If the size of the data statistical table has already reached the predetermined threshold, that is, the data statistical table is already full, the controller 131 reduces, at block 540, entries of the data statistical table, and then adds, at block 530, the data chunk, the identification of the data chunk and the count value 1 into the reduced data statistical table as one entry.

Figure 6:
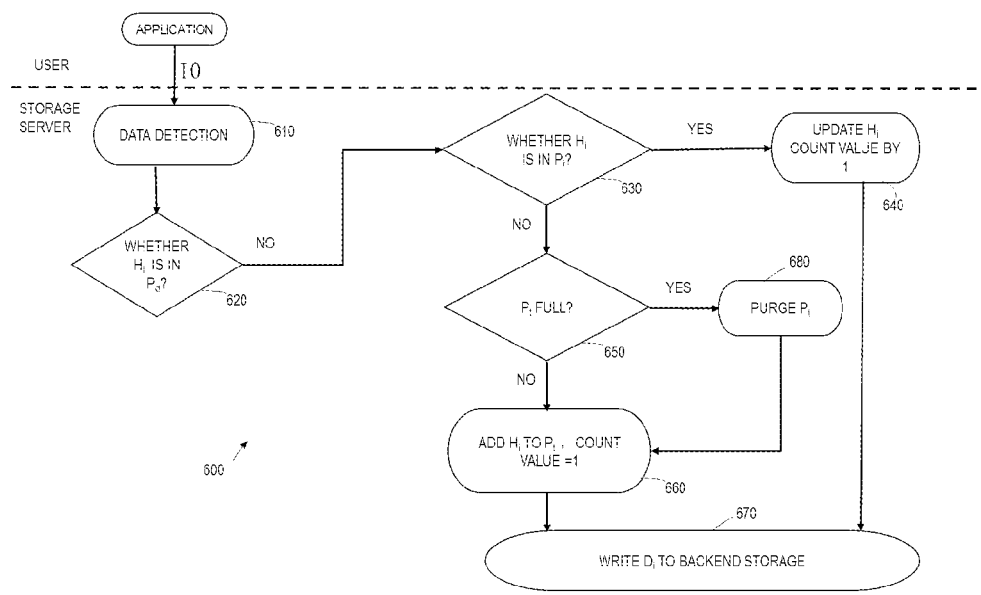
FIG. 6 illustrates a flow chart of another method of establishing/updating a data pattern table using a data statistical table with size limit according to the embodiments of the present disclosure.

FIG. 6 illustrates another example method 600 for updating the data pattern table. To simplify the description, representations of symbols used in the method of FIG. 6 are shown in Table 1.

TABLE 1

Symbol Representation in Method 600

| Sign | Description |
| --- | --- |
| $D_i$ | incoming IO data chunk i |
| $L_i$ | Length of $D_i$ |
| $H_i$ | identification of $D_i$, e.g., digest |
| T | job running time for creating the data pattern table |
| $P_d$ | data pattern table |
| $P_t$ | temporary data statistical table for populating $P_d$ |
| $N_t$ | length of $P_t$ |
| E | number of patterns to be added to $P_d$ |

Figures 7, 8, 9:
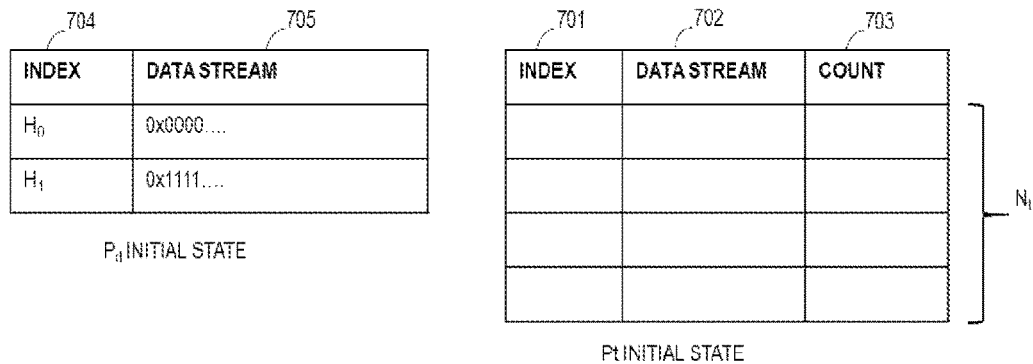
FIG. 7 illustrates examples of initial state of a data statistical table and a data pattern table according to the embodiments of the present disclosure.
FIG. 8 illustrates examples of running states of data statistical table according to the embodiments of the present disclosure.
FIG. 9 illustrates an example of a ranked data statistical table according to the embodiments of the present disclosure.

The method 600 can, but not limited to, be implemented by the controller 131 in FIG. 1. To facilitate description, the method 600 is explained with reference to the system 100 and the controller 131 of FIG. 1. Additionally, in some embodiments, a data statistical table $P_t$ and a data pattern table $P_d$ can include the content shown in FIG. 7 at the initial state of the method 600. The data statistical table $P_t$ is used in running time of a job to save temporary data stream information. Each row represents one entry that records a data stream 702, a digest 701 of the data stream and a count 703 of the number of times that the data stream is detected during the running time of the job. The data statistical table $P_t$ is initialized to be empty and can contain at most $N_t$ entries. Each entry of the data pattern table $P_d$ includes a data stream 705 and a digest value 704 of the data stream and is initialized to a data pattern consisting of all zeros and all ones. As shown in FIG. 7, the two data patterns respectively have digest $H_0$ and $H_1$ as an example.

Return to FIG. 6. In the example method 600, the controller 131 receives a data write request from an application (e.g., application 121 in FIG. 1), and detects, at block 610, data associated with the data write request, for example, identifying a data chunk $D_i$ with a length of $L_i$ and generating its identification $H_i$, such as digest.

At block 620, the controller 131 determines whether the digest $H_i$ of the data chunk has already been included in the data pattern table $P_d$, for example, determining whether the digest $H_i$ equals to an already stored digest (such as $H_0$ or $H_1$) in the data pattern table $P_d$. If the data pattern table $P_d$ has already included the identification of the data chunk, the data chunk will not be repeatedly written into the backend storage. If the data pattern table $P_d$ excludes the identification of the data chunk, the controller 131 determines, at block 630, whether the identification $H_i$ of the data chunk has already existed in the temporary data statistical table $P_t$.

If the data statistical table $P_t$ has already included the identification of the data chunk, the count of the entry corresponding to the data chunk in the data statistical table $P_t$ is increased by 1 at block 640, and the data chunk is written into the backend storage at block 670. If the data statistical table $P_t$ excludes the identification of the data chunk, the controller 131 determines, at block 650, whether the data statistical table $P_t$ is full, that is, whether reaching a threshold.

If the data statistical table $P_t$ is not full, the controller 131 adds, at block 660, the data chunk, the identification of the data chunk and a count value 1 into the data statistical table $P_t$ as a new entry, and writes the data chunk into the backend storage at block 670. If the data statistical table $P_t$ is already full, the controller 131, at block 680, purges the data statistical table $P_t$ and reduces its entries to make space for adding new entry. Afterwards, the controller adds the data chunk, its identification and the count 1 into the data statistical table $P_t$ and writes the data chunk into the backend storage.

In some embodiments, the controller 131 reduces, at block 680, the entries of the data statistical table by deleting one or more entries with the minimum count value from the data statistical table. In some embodiments, the number of entries deleted can be configured. As an example instead of a limitation, the controller 131 can reduce the number of entries of the data statistical table by half. For example, the controller 131 can rank the entries of the data statistical table $P_t$ according to count values, e.g., ranking the entries according to an ascending order of the count values, such that the entry with the minimum count of data patterns is positioned at the bottom of the data statistical table. It should be noted that if a plurality of data patterns have a same count value, the ranking among the plurality of data patterns can be randomly determined. During reducing, the controller 131 deletes entries from the bottom of the data statistical table until half of the space is released. After finishing the purge of the data statistical table, new data processing (e.g., addition of an entry) can continue.

FIG. 8 illustrates an example of the state of the data statistical table $P_t$ after the method 600 has run for a while. In this example, the data statistical table $P_t$ is populated with $N_t$ different data streams and their count values. As described above, when the data statistical table $P_t$ has a limited length, there might be a scenario as below, that is, the data chunk is not included in the data statistical table $P_t$ and cannot be added into the data statistical table $P_t$ because the $P_t$ is full. In this case, a purge operation to the data statistical table can be executed at block 680 of FIG. 6 to make space for new coming data.

The method 600 can be executed during the time period of updating the data pattern table and when the time period is finished, e.g., when a predetermined time T expires, the controller 131 writes the recorded E data chunks with the maximum count and the identifications of these data chunks in the data statistical table $P_t$ into the data pattern table $P_d$, where E is an integer greater than or equal to 1 and the specific value thereof can be configured as required. For example, the controller 131 can rank entries in the data statistical table $P_t$ according to count values. FIG. 9 illustrates an example of a final state of the ranked data statistical table $P_t$. In this example, the data statistical table $P_t$ includes $N_t$ entries and an entry near the bottom has a corresponding minimum count value. The E entries at the top of the data statistical table $P_t$ have the maximum count value and will be written into the data pattern table $P_d$ to update the $P_d$. An example of the updated data pattern table $P_d$ is shown in FIG. 10 which includes other frequently used data patterns acquired from statistics other than data patterns of all-zero and all-one.

The updated data pattern table $P_d$ can be written into the backend storage 110 of FIG. 1. Besides, the data pattern table $P_d$ can be removed from an internal memory after the update of the $P_d$ is finished.

Once the data pattern table $P_d$ is created, the processing of incoming IOs is the same as an ordinary deduplication algorithm which uses a data pattern table. The only difference is that the adopted data pattern table includes other data patterns the data patterns of all-zero and all-one, so as to improve the processing efficiency of data. For example, FIG. 11 illustrates operations of a method 1100 for controlling data storage according to the embodiments of the present disclosure. The operations can, but not limited to, be executed by the controller 131 in FIG. 1. For the purpose of simplifying the description instead of limiting it, the example method 1100 will be described below with reference to the system of FIG. 1.

Figures 10, 11:
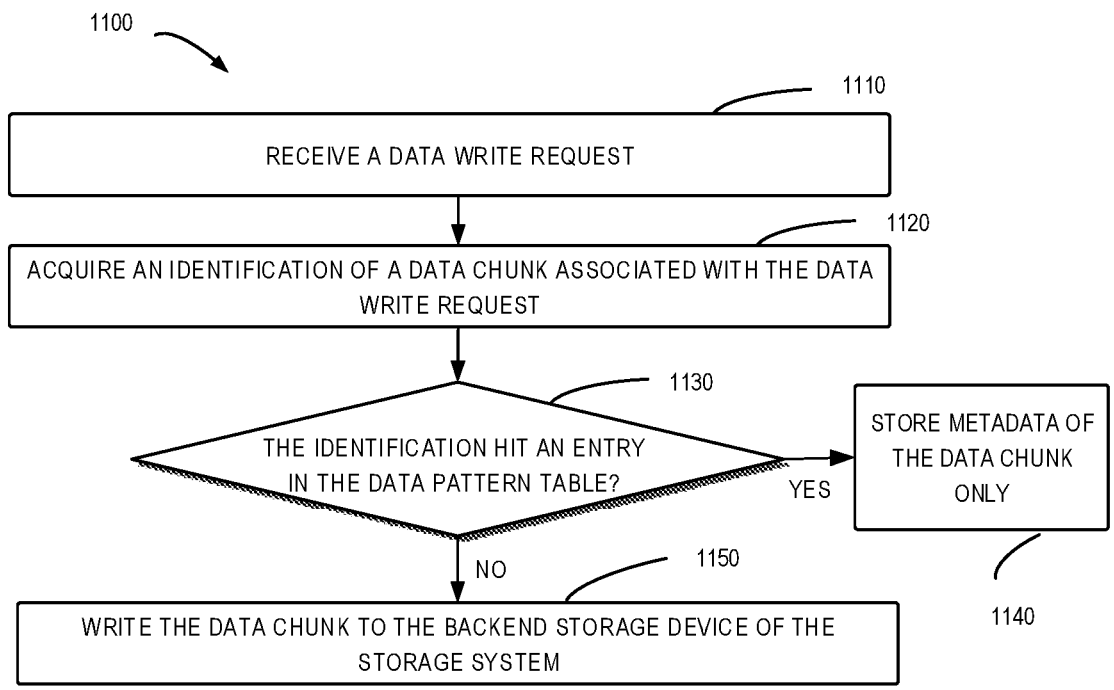
FIG. 10 illustrates an example of an updated data pattern table according to the embodiments of the present disclosure.
FIG. 11 illustrates a flow chart of a method of controlling storage of a storage system based on a data pattern table according to the embodiments of the present disclosure.

As shown in FIG. 11, the controller 131 receives, at block 1110, a data write request, and acquires, at block 1120, the identification of a data chunk associated with the data write request. The controller compares, at block 1130, the identification with the entries in the data pattern table 111. Each entry of the data pattern table includes data frequently used by the storage system and the identification of the data, and at least one entry includes a data pattern other than all-zero and all-one data patterns. The data pattern table, for example, can be established or updated through any of the methods with reference to FIGS. 2-10.

If the identification hits an entry in the data pattern table 111, the controller 131 only stores, at block 1140, the metadata of the data chunk without writing the data chunk into the backend storage device 110 of the storage system. If the identification fails to hit an entry in the data pattern table 111, the controller 131 writes, at block 1150, the data chunk into the backend storage device 110 of the storage system. This method avoids repeatedly writing of the data to the backend storage, thereby saving the storage space and improving processing efficiency of data. Moreover, as the adopted data pattern table 111 can include user-specific data patterns acquired from statistics, the processing efficiency of data can be further improved.

Figure 12:
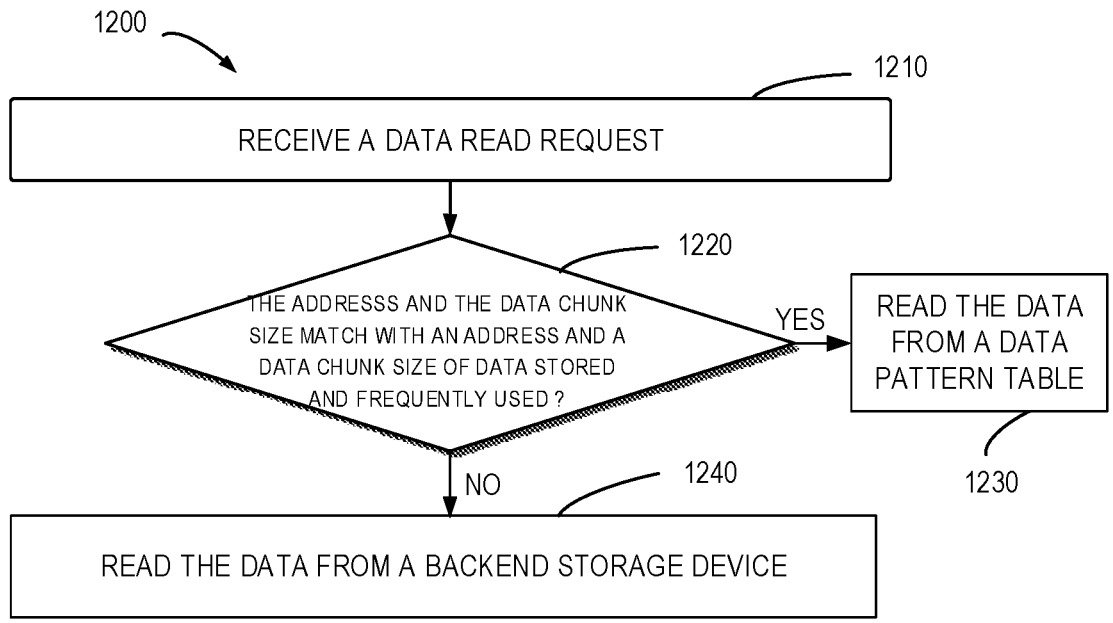
FIG. 12 illustrates a flow chart of a method of controlling read of a storage system based on a data pattern table according to the embodiments of the present disclosure.

FIG. 12 illustrates operations of a method 1200 for controlling data access according to the embodiments of the present disclosure. The operations can, but not limited to, be executed by the controller 131 in FIG. 1. For the purpose of simplifying the description instead of limiting it, the example method 1200 will be described below with reference to the system of FIG. 1.

As shown in FIG. 12, the controller 131 receives, at block 1210, a data read request, for example, from the application 121 in FIG. 1. The data read request includes an address and a data chunk size of data to be read. The controller 131 compares, at block 1220, the address and the size of the data chunk included in the data read request with the address and size of the data chunk of the data stored and frequently used. If they match, the controller 131 reads, at block 1230, the data directly from the data pattern table 111. Each entry of the data pattern table 111 includes data frequently used by the storage system and the identification of the data, and at least one entry in the data pattern table 111 includes data patterns other than all-zero and all-one data patterns. The data patterns, for example, are added to the data pattern table 111 via any of the methods with reference to FIGS. 2-10. If a comparison at block 1220 displays a mismatch, the controller 131 reads, at block 1240, the data from the backend storage device 110, and the read data is returned to the application 121.

By using the method 1200, the controller 131 can first calculate a data chunk in size $L_i$ to get a digest for the incoming read request and look up the digest in the data pattern table $P_d$. If the digest hits an entry in the data pattern table, the controller 131 will not write the data to be written by an IO to the backend, but only needs to save its metadata, to record its digest and LBA address. Similarly, when any read request from the host matches with a stored LBA address and the chunk size of data, the controller 131 can acquire the data directly from the data pattern table 111 without reading from the backend storage 110.

The above operations can save storage space. For the purpose of explanation instead of limitation, embodiments that save space by utilizing the data pattern table are described. First of all, a digest function is selected. There are already many hash functions that have high computing efficiency and robust implementing library and they can be chosen as the digest function. For example, SHA-256 digest can be selected. Other parameters can be selected based on user-specific production environment. The inventor of the present disclosure found that some data patterns in 8K size are frequently appeared in a typical vmdk file. Thus, in a scenario where user wants to deploy a large number of virtual machines, parameter values shown in Table 2 can be selected. The meanings of various parameters are identical to those in Table 1.

TABLE 2

| Parameter Selection | |
|---|---|
| Parameter | Value |
| $L_i$ | 8K bytes |
| $N_t$ | 10,000 |
| T | 10 minutes |
| E | 3 |

According to the above parameter setting, when a user starts to create a first virtual machine, a creating/updating job of the data pattern table can, for example, run for 10 minutes. Afterwards, a predetermined number (e.g., the first 3) of frequently appeared data patterns are selected and added to the data pattern table. As the job only runs for a short time (such as 10 minutes), it will not impact the performance IOs of a system and the data pattern table is also kept in a small size. After creating/updating the data pattern table, the read and write of the IOs will be benefited from looking up data pattern and identifying identical data pattern.

In some embodiments, statistical data can be further displayed to customers during an IO handling procedure, e.g., in the method 1100 and/or 1200. The statistical data, for example, can display the number of times a data pattern in the data pattern table being hit and/or a space being saved.

To evaluate improvement of storage efficiency of data by a customized data pattern table, the present disclosure takes a vmdk file as an example for analysis. Virtualization is a popular application used by customers and a vmdk file is used by a VMware which represents a virtual host. As an example, a vmdk file representing Windows 7 host is selected. A python script is used to divide this file into data chunks in 8k, which is the same data chunk size used in existing storage products. Then, python's numpy and pandas libraries are employed to efficiently compute SHA digest of each chunk, counting the number of the same digests and ranking the count numbers, so as to obtain the following most frequently appeared data patterns and their count values:

| Count | Data Pattern |
|---|---|
| 3492 | '00000000000000000000000000000000 . . . ' |
| 1787 | 'ffffffffffffffffffffffffffffffff . . . ' |
| 1553 | 'dadadadadadadadadadadadadadadada . . . ' |
| 974 | '3f3f3f3f3f3f3f3f3f3f3f3f3f3f3f3f . . . ' |
| 453 | '6f6f6f6f6f6f6f6f6f6f6f6f6f6f6f6f . . . ' |
| 217 | '3f003f003f003f003f003f003f003f00 . . . ' |
| 123 | '01010101010101010101010101010101 . . . ' |
| 96 | '25310d0a000000000c00000025310d0a . . . ' |
| 95 | '000000000c00000025310d0a00000000 . . . ' |
| 94 | '0c00000025310d0a000000000c000000 . . . ' |

The above 10 most frequently appeared data patterns have a total count value of 8884, and the top two of the most frequently appeared data patterns are all zeros and all ones as expected. For the sake of simplicity, data storage efficiency is roughly estimated using the count value as a rough evaluation. By using a data pattern table with only all zeros and all ones, there are totally 3492+1787=5279 data chunks being deduplicated. However, by using a customized data pattern table consisting of the above ten data patterns, 8884 data chunks can be deduplicated and saved space increases about 68% compared with using a table with only all zeros and all ones. Furthermore, if the predefined data pattern table has only all zeros, then only 3492 data chunks are deduplicated. By comparison, the customized table can save about 154% space. Accordingly, a use of the customized data pattern table proposed by the present disclosure can significantly improve storage efficiency of data.

It is noted that a further aspect of the present disclosure also provides a control apparatus for controlling a storage system. The control apparatus can be implemented as, for example, the storage server 130 in FIG. 1. The control apparatus, for example, can include the controller 131 in FIG. 1, which can execute operations of any of the above methods with reference to FIGS. 2-10. The above operations in combination with methods 200-600, 1100 or 1200 are also applicable to the control apparatus and will not be repeated here.

Figure 13:
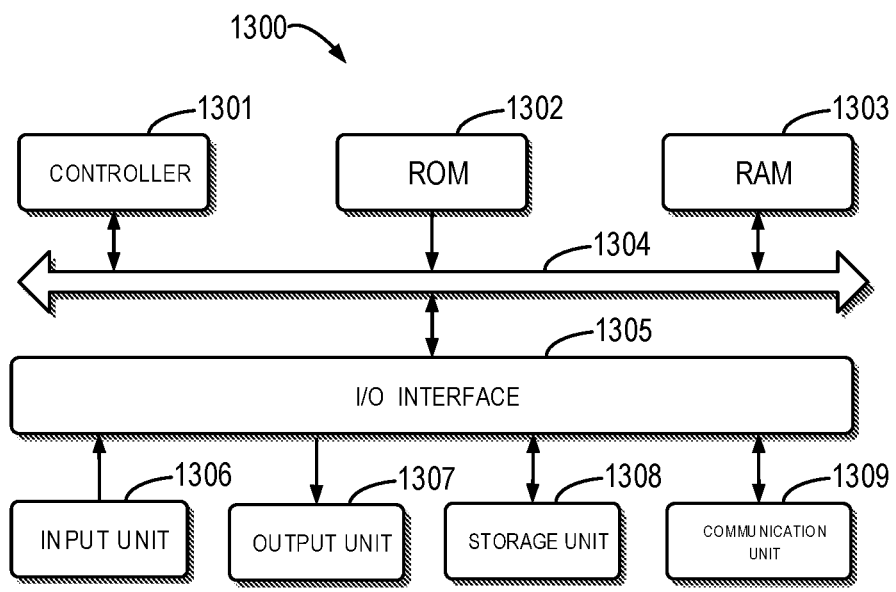
FIG. 13 illustrates an example structure diagram of an electronic device according to the embodiments of the present disclosure.

FIG. 13 illustrates a schematic block diagram of an electronic device 1300 for implementing embodiments of the present disclosure. As shown in FIG. 13, the electronic device 1300 includes a controller or known as a processing unit (e.g., CPU) 1301, which can execute various suitable actions and processing based on the programs stored in a read-only memory (ROM) 1302 and/or a random-access memory (RAM) 1303. The ROM 1302 and/or RAM 1303 can store all kinds of programs and data required by the operations of the device 1300. The controller 1301, ROM 1302 and RAM 1303 are connected to each other via a bus 1304. In particular, the electronic device 1300 also includes one or more dedicated processing units (not shown), which can also be connected to the bus 1304.

An input/output (I/O) interface 1305 is also connected to the bus 1304. A plurality of components in the electronic device 1300 is connected to the I/O interface 1305, including: an input unit 1306, such as a keyboard, a mouse and the like; an output unit 1307, e.g., various kinds of displays and loudspeakers etc.; a storage unit 1308, such as a magnetic disk and an optical disk etc.; and a communication unit 1309, such as a network card, a modem, a wireless transceiver and the like. The communication unit 1309 allows the electronic device 1300 to exchange information/data with other devices via a computer network, such as Internet, and/or various telecommunication networks.

In some embodiments, the controller 1301 can be configured to execute each of the above described procedures and processing, such as methods 200-600, 1100 or 1200. For example, in some embodiments, the methods 200-600, 1100 or 1200 can be implemented as a computer software program tangibly included in a machine-readable medium, e.g., a storage unit 1308. In some embodiments, a computer program can be partially or fully loaded and/or mounted to the electronic device 1300 via the ROM 1302 and/or the communication unit 1309. When the computer program is loaded to the RAM 1303 and executed by the controller 1301, one or more operations of the above described methods 200-600, 1100 or 1200 can be implemented. Alternatively, the controller 1301 can also be configured in any other suitable manners to implement the above procedure/method in other embodiments.

In particular, the above described methods and devices with reference to FIGS. 2-13, according to the embodiments of the present disclosure, can be implemented as a computer program product, which is tangibly stored on a non-transient computer-readable storage medium and include machine-executable instructions. The instructions, when executed, can enable the machine to fulfill each of the aspects according to the present disclosure.

The computer-readable storage medium can be a tangible apparatus that stores instructions utilized by the instruction executing apparatuses. The computer-readable storage medium can include, but not limited to an electrical storage device, a magnetic storage device, an optical storage device, an electromagnetic storage device, a semiconductor storage device or any appropriate combinations thereof. More concrete and non-exhaustive examples of the computer-readable storage medium include: a portable computer disk, a hard disk, a random-access memory (RAM), a read-only memory (ROM), an erasable programmable read-only memory (EPROM or flash), a static random-access memory (SRAM), a portable compact disk read-only memory (CD-ROM), a digital disk (DVD), a memory stick, a floppy disk, a mechanical encoded device, such as punched cards or raised structures in a groove having instructions recorded thereof, and any appropriate combinations thereof.

Computer program instructions for carrying out operations of the present disclosure may be assembly instructions, instruction set architecture (ISA) instructions, machine instructions, machine dependent instructions, microcodes, firmware instructions, state setting data, or either source code or object code written in any combination of one or more programming languages, including an object-oriented programming languages such as Java, Smalltalk, C++ and so on, and conventional procedural programming languages, such as "C" language or similar programming languages.

The computer-readable program instructions can execute fully on the user's computer, partially on the user's computer, as a stand-alone software package, partially on the user's computer and partially on the remote computer, or entirely on the remote computer or server. In the case where remote computer is involved, the remote computer can be connected to the user's computer via any type of networks, including a local area network (LAN) or a wide area network (WAN), or the connection may be made to an external computer (e.g., connected via the Internet using an Internet service provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Various aspects of the present disclosure are described here with reference to block diagrams and/or flow charts of devices, methods and computer program products according to the embodiments of the present disclosure. It should be understood that each block of the block diagrams and/or flow charts and the combination of various blocks in the block diagram and/or flow chart can be implemented by the computer readable program instructions Although the present disclosure has been described with reference to various embodiments, it is to be understood that the present disclosure is not limited to the disclosed embodiments. Without deviating from the essence of the present disclosure, all modifications and transformations fall within the protection scope of the present disclosure defined by claims.

We claim:

1. A method of controlling storing of data, comprising:
   receiving a data write request;
   acquiring an identification of a data chunk associated with the data write request;
   comparing the identification with an entry in a data pattern table, each entry in the data pattern table comprising data frequently used by a storage system and an identification of the data, and at least one entry comprising a data pattern other than all-zero and all-one data patterns;
   in response to the identification hitting an entry in the data pattern table, storing metadata of the data chunk only without writing the data chunk to a backend storage device of the storage system; and
   in response to the identification failing to hit an entry in the data pattern table, writing the data chunk to the backend storage device of the storage system.

2. The method according to claim 1, wherein the identification comprises a digest of the data chunk.

3. The method according to claim 1, further comprising:
   displaying, to a user, the number of times a data pattern in the data pattern table being hit and/or a storage space being saved for the storage system.

4. A method of controlling reading of data, comprising:
   receiving a data read request comprising an address and a data chunk size of data to be read;
   in response to the address and the data chunk size included in the data read request matching with an address and a data chunk size of data stored and frequently used, reading the data from a data pattern table, each entry of the data pattern table comprising data frequently used by a storage system and an identification of the data, and at least one entry comprising a data pattern other than all-zero and all-one data patterns; and
   in response to the address and the data chunk size included in the data read request failing to match with an address and a data chunk size of data stored and frequently used, reading the data from a backend storage device.

5. The method according to claim 4, wherein:
   the entry in the data pattern table indicates a data chunk and a digest of the data chunk.

6. Electronic circuitry, comprising:
   at least one processor; and
   at least one memory coupled to the at least one processor and including computer program code stored thereon, the computer program code, when executed by the at least one processor, causing the electronic device to perform the method of:
   receiving a data write request,
   acquiring an identification of a data chunk associated with the data write request,
   comparing the identification with an entry in a data pattern table, each entry in the data pattern table comprising data frequently used by a storage system and an identification of the data, and at least one entry comprising a data pattern other than all-zero and all-one data patterns,
   in response to the identification hitting an entry in the data pattern table, storing metadata of the data chunk only without writing the data chunk to a backend storage device of the storage system, and
   in response to the identification failing to hit an entry in the data pattern table, writing the data chunk to the backend storage device of the storage system.

7. A computer program product having a non-transitory computer readable medium which stores a set of instructions for controlling storing of data; the set of instructions, when carried out by computerized circuitry, causing the computerized circuitry to perform a method of:
   receiving a data write request;
   acquiring an identification of a data chunk associated with the data write request;
   comparing the identification with an entry in a data pattern table, each entry in the data pattern table comprising data frequently used by a storage system and an identification of the data, and at least one entry comprising a data pattern other than all-zero and all-one data patterns;
   in response to the identification hitting an entry in the data pattern table, storing metadata of the data chunk only without writing the data chunk to a backend storage device of the storage system; and
   in response to the identification failing to hit an entry in the data pattern table, writing the data chunk to the backend storage device of the storage system.

* * * * *